(12) United States Patent
Kikuchi et al.

(10) Patent No.: US 6,404,955 B1
(45) Date of Patent: Jun. 11, 2002

(54) SYSTEM AND METHOD FOR FABRICATING ARRAYED OPTICAL FIBER COLLIMATORS

(75) Inventors: Juro Kikuchi, Kubo Kakegawa; Yasuyuki Mizushima, Sonogaya Kakegawa; Hiroki Takahashi, Fukuroi; Yoshiaki Takeuchi, Shizuoka, all of (JP)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 09/898,622

(22) Filed: Jul. 3, 2001

(51) Int. Cl.[7] .................................................. G02B 6/32
(52) U.S. Cl. .......................................................... 385/35
(58) Field of Search ........................... 427/163.1; 205/73, 205/79; 385/31, 35, 39, 88, 90–91, 89, 92–94, 147, 16, 33, 43, 11, 83, 137

(56) References Cited

U.S. PATENT DOCUMENTS

| 3,874,783 A | * | 4/1975 | Cole ........................... 385/115 |
| 3,906,241 A | * | 9/1975 | Thompson ................. 250/227.11 |
| 4,707,134 A | * | 11/1987 | McLachlan et al. ... 250/227.29 |
| 4,733,933 A | * | 3/1988 | Pikulski ...................... 250/577 |
| 5,574,811 A | | 11/1996 | Bricheno et al. |
| 5,835,659 A | | 11/1998 | Ota et al. |
| 6,011,649 A | | 1/2000 | Chang |
| 6,118,910 A | | 9/2000 | Chang |
| 6,174,092 B1 | | 1/2001 | Siala |
| 6,174,424 B1 | | 1/2001 | Wach et al. |

* cited by examiner

Primary Examiner—Akm E. Ullah
(74) Attorney, Agent, or Firm—Juliana Agon (57) ABSTRACT

An alignment procedure aligns the components of an arrayed optical fiber collimator and reduces losses associated with the collimator. Initially, an optical fiber array block including a plurality of individual optical fibers is received and retained. Next, a microlens array substrate including a plurality of microlenses integrated along a microlens surface and a substrate surface opposite the microlens surface is received and retained. Then, at least a portion of a first light receiver that is positioned to receive a light beam from at least one of the integrated microlenses is received and retained. Next, at least one light beam is provided from the light source to at least one of the plurality of individual optical fibers. Then, the position of at least one of the microlens array substrate and the optical fiber array block is adjusted in relation to each other to maximize the optical power of the light beam received by the first light receiver.

40 Claims, 4 Drawing Sheets

SYSTEM AND METHOD FOR FABRICATING ARRAYED OPTICAL FIBER COLLIMATORS

BACKGROUND OF THE INVENTION

1. Field of the Invention

The present invention is generally directed to arrayed optical fiber collimators and, more specifically, a system and method for fabricating arrayed optical fiber collimators.

2. Technical Background

Arrayed optical fiber collimators are increasingly utilized in optical systems. For example, arrayed optical fiber collimators have been used or proposed for use in conjunction with various optical chips, e.g., optical isolator chips and optical circulator chips. Due to the recent increase in demand for arrayed optical devices to be used in dense wavelength division multiplexing (DWDM) systems, reducing the arrayed optical device cost has become increasingly important. However, the effectiveness of optical devices that use collimating arrays, incorporating graded-index (GRIN), aspheric or Fresnel microlenses, are highly dependent on the configuration of a given optical fiber collimator array. As such, it is important to configure the fiber collimator array to reduce optical losses.

What is needed is a system and method for aligning components of an arrayed optical fiber collimator that is practical and minimizes optical losses.

SUMMARY OF THE INVENTION

The present invention is directed to a system and method for actively aligning components of an arrayed optical fiber collimator. Initially, a first fixture is provided for receiving and retaining an optical fiber array block, which receives and retains a plurality of individual optical fibers. Next, a second fixture is provided for receiving and retaining a microlens array substrate that includes a plurality of microlenses integrated along a microlens surface and a substrate surface opposite the microlens surface. Then, a third fixture is provided for receiving and retaining at least a portion of a first light receiver that is positioned to receive a light beam from at least one of the integrated microlenses. Next, at least one light beam is provided from the light source to at least one of the plurality of individual optical fibers. The relative position of at least one of the microlens array substrate and the optical fiber array block is then adjusted to maximize the optical power of the light beam received by the first light receiver. Finally, a finished arrayed optical fiber collimator is provided by fixing the optical fiber array block to the microlens array substrate when the optical power provided by the integrated microlens is at a maximum.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT(S)

Figure 1:
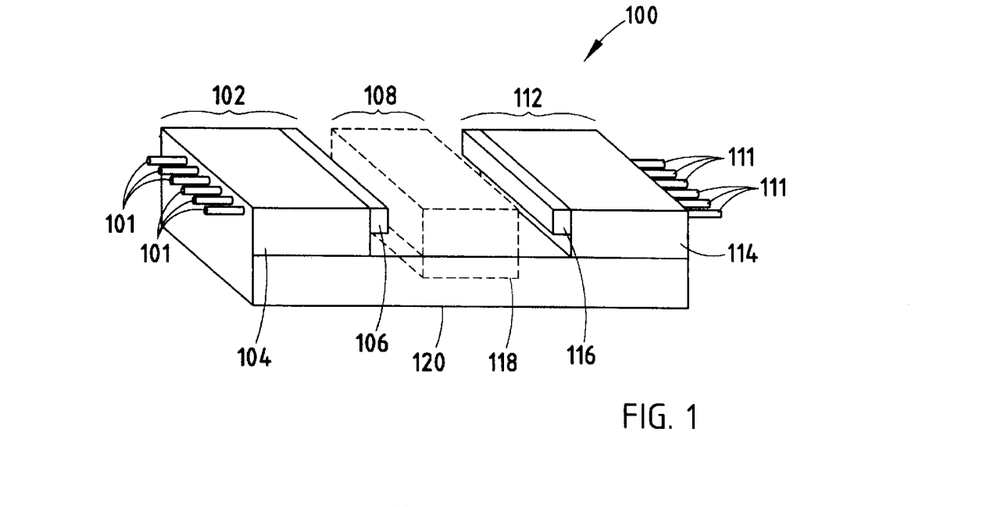
FIG. 1 is a perspective view of an arrayed optical device, according to an embodiment of the present invention.

FIG. 1 shows an arrayed optical device 100 that includes a first arrayed optical fiber collimator 102 and a second arrayed optical fiber collimator 112. The first arrayed optical fiber collimator 102 includes a first optical fiber array block 104, which retains a plurality of optical fibers 101, and a first microlens array substrate 106, which includes a plurality of microlenses integrated along a microlens surface. The second arrayed optical fiber collimator 112 includes a second optical fiber array block 114, which retains a second plurality of optical fibers 111, and a second microlens array substrate 116, which includes a plurality of microlenses integrated along a microlens surface. An optical chip (e.g., an isolator chip, a circulator chip, filter, etc.) 108 is retained within a groove 118 formed in substrate 120. Both the first arrayed optical fiber collimator 102 and the second arrayed optical fiber collimator 114 are coupled (e.g., with an adhesive) to the substrate 120 such that they are fixed in relation to each other and the chip 108 after alignment.

Figure 2A:
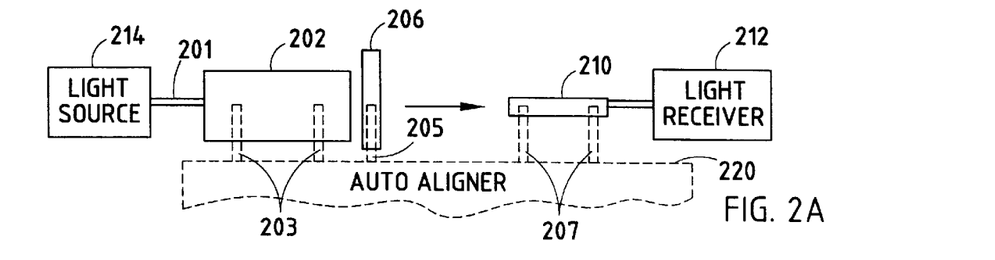
FIGS. 2A–2C are diagrams of a setup for aligning an optical fiber array block and a microlens array substrate, according to an embodiment of the present invention.
Figure 2B:
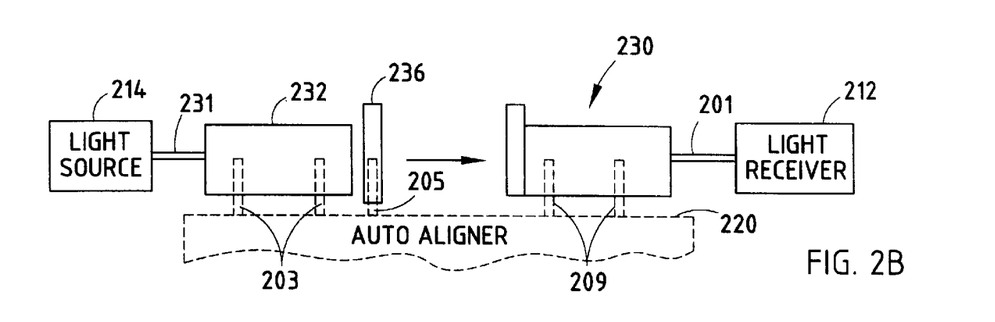

Moving to FIG. 2, a procedure for aligning an optical fiber array block 202, which retains a plurality of optical fibers 201 (e.g., eight optical fibers), with a microlens array substrate 206 is depicted. The fibers 201 are coupled to a light source 214 that preferably provides a light beam to each of the fibers 201. Alternatively, the light source 214 may only provide a light beam to fibers 201 at each end. As shown in FIG. 2A, a first fixture 203 receives and retains the block 202 and is coupled to an auto-aligner 220 to facilitate movement of the block 202 with respect to substrate 206 and a single mode collimated (SMC) optical fiber 210. The substrate 206 is received and retained by a second fixture 205, which attaches the substrate 206 to the auto-aligner 220 facilitating movement of the substrate 206 by the auto-aligner 220. The SMC optical fiber 210 is coupled to a receiver 212 and is received and retained by a fixture 207. The block 202 and the substrate 206 are adjusted in relation to each other to achieve maximum optical power from each fiber 201 and its corresponding microlens, as seen by the receiver 212 (through the SMC optical fiber 210). It will be appreciated that to achieve optimal alignment between the plurality of optical fibers 201 of the block 202 and microlenses of the substrate 206 requires precise indexing by the auto-aligner 220. When a desired alignment is achieved, the block 202 is affixed (e.g., with an optical adhesive) to the substrate 206, which provides a finished arrayed optical fiber collimator 230 that is utilized in conjunction with the procedure of FIG. 2B.

As shown in FIG. 2B, the plurality of optical fibers 201 of the collimator 230 are coupled to the receiver 212. The collimator 230 is then coupled to the auto-aligner 220 through a fixture 209 that receives and retains the collimator 230. A light source 214 is then coupled to a plurality of optical fibers 231 that are retained in optical fiber array block 232. The optical fiber array block 232 is then coupled to the auto-aligner 220 through the fixture 203. A microlens array substrate 236 is then coupled to the auto-aligner 220, through a fixture 205. The block 232 and the substrate 236 are then moved by the auto-aligner 220 to facilitate optimum optical power transfer through the optical fibers 231, retained in the block 232, and microlenses of the substrate 236, as detected by the receiver 212 through the collimator 230. When maximum power transfer is achieved, the block 232 is fixed (e.g., with an optical adhesive) to the substrate 236 forming another collimator 250, as is shown in FIG. 2C.

Figure 2C:
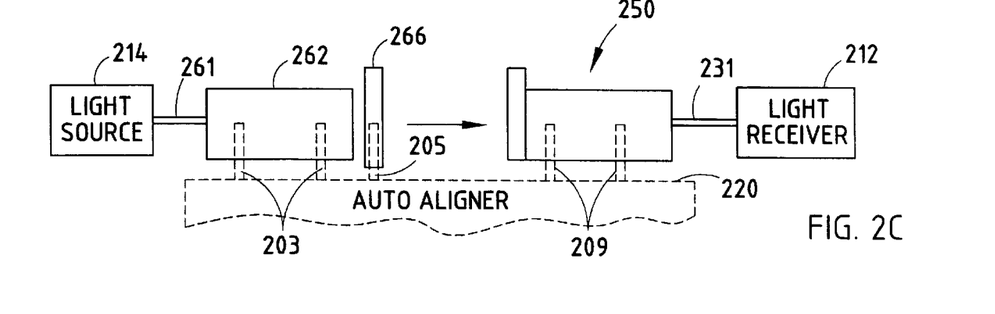

As shown in FIG. 2C, the collimator 250 is then coupled to the auto-aligner 220, utilizing the fixture 209, and is coupled to the light receiver 212 through the plurality of optical fibers 231. An optical fiber array block 262, which retains a plurality of optical fibers 261 that are coupled to the light source 214, is then coupled to the auto-aligner 220 through the fixture 203, which receives and retains the block 262. A substrate 266 is then coupled to the auto-aligner 220, through a fixture 205, which receives and retains the substrate 266. Similar to the procedure of FIG. 2B, the block 262 and the substrate 266 are aligned with each other to provide maximum power transfer through the microlenses of the substrate 266, as seen by the light receiver 212, through the collimator 250. Thus, a procedure has been described wherein one fabricated collimator is utilized to align a next microlens array substrate with a next optical fiber array block to produce a next collimator.

Figure 3:
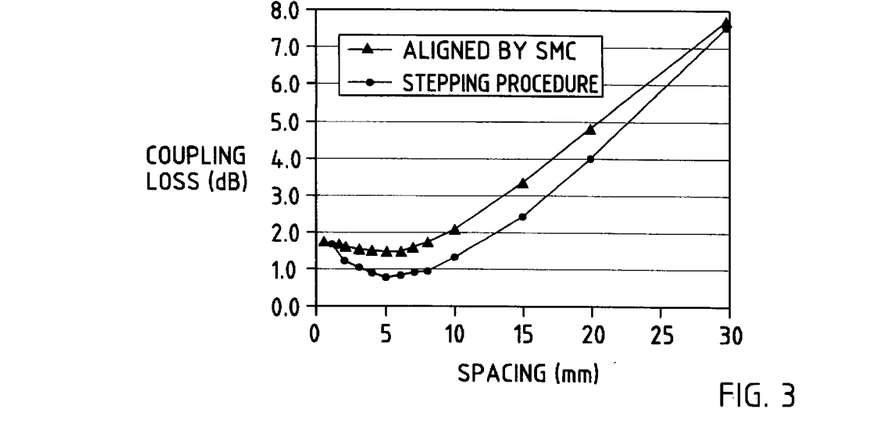
FIG. 3 is a graph depicting coupling loss as a function of spacing for a pair of arrayed optical fiber collimators whose components were aligned by a single-mode collimated (SMC) fiber procedure and a stepping procedure, according to embodiments of the present invention.

FIG. 3 depicts a graph, which shows the coupling loss of a pair of fabricated collimators using the SMC fiber procedure and using the stepping procedure, described above. As shown in FIG. 3, the minimum coupling loss of a pair of collimators aligned with the SMC fiber was about 1.5 dB when one collimator was placed five to six millimeters from the other collimator which was aligned in the same manner. A 0.6 dB decrease was achieved by utilizing a prior fabricated collimator to align a next fabricated collimator, when the fabricated collimator was placed five to six millimeters from the other collimator. However, misalignment can remain without a perfect master collimator and the first two or three collimators must typically be discarded. Further, alignment through the detection of the collimated light beam is not particularly sensitive to X, Y and Z axis movement since the collimated light beam is generally to wide to align in micron or sub-micron order (beam diameter is typically in a range of 100 to 140 microns in this case).

Figure 4:
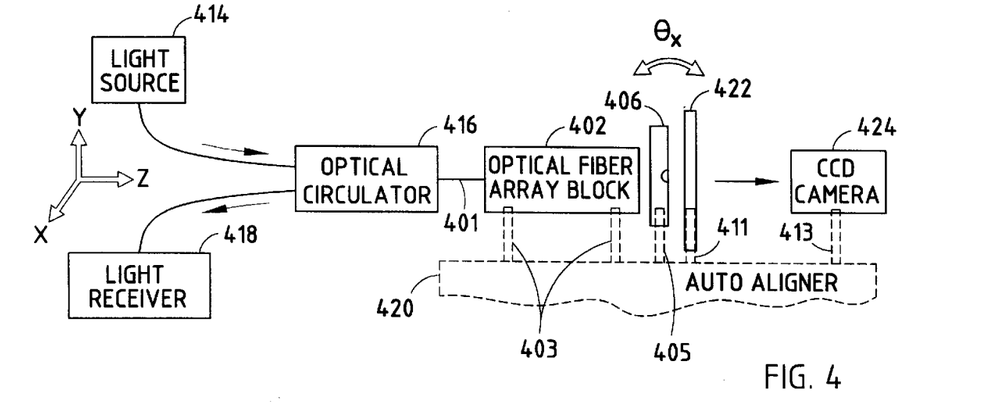
FIG. 4 is a block diagram of a setup for aligning an optical fiber array block with a microlens array substrate, according to another embodiment of the present invention.

FIG. 4 depicts an alternative system for aligning an optical fiber array block 402 with a microlens array substrate 406. A light source (e.g., a laser diode) 414 is coupled to an optical circulator 416, which is coupled to a light receiver (e.g., a photodetector) 418. The circulator 416 is also coupled to a plurality of optical fibers 401 that are retained in the block 402. The block 402 is coupled to an auto-aligner 420 by a fixture 403, which receives and retains the block 402. The substrate 406 is coupled to the auto-aligner 420 by a fixture 405, which receives and retains the substrate 406. A half-mirror 422 is coupled to the auto-aligner 420 by a fixture 411, which receives and retains the mirror 422. A charge-coupled device (CCD) camera 424 is coupled to the auto-aligner 420 through a fixture 413 that receives and retains the CCD camera 424. In this manner, the auto-aligner 420 can adjust the block 402, the substrate 406 and the mirror 422 with respect to the camera 424 and in relation to each other in three dimensions (X, Y and Z).

Initially, the block 402 and the mirror 422 are brought into contact by the auto-aligner 420, such that they can be aligned in the θX and θY directions for maximum optical power transfer. This puts the block 402 and the mirror 422 in parallel. Next, the mirror 422 is moved away from the block 402 in the Z direction. Then, the substrate 406 is placed between the block 402 and the mirror 422. The light source 414 then provides a light beam to at least a first one of the optical fibers 401 and a last one of the optical fibers 401 such that visual alignment is conducted by visually examining the lighting position through the microlens of the substrate 406 with the camera 424. Next, the mirror 422 and the substrate 404 are positioned at a distance α, which corresponds to the optical length between a microlens and a beam waist point (the point in the Gaussian beam where the wave front has a curvature of zero and the beam diameter is a minimum) to be formed. A light beam is then inserted into the fibers 401 and the block 402 and the microlenses of the substrate 406 are aligned by examining the reflected light power as seen at the light receiver 418. When optimum alignment is achieved, the block 402 and the substrate 404 are fixed (e.g., with an optical adhesive) to each other to form an arrayed optical fiber collimator.

Figure 5:
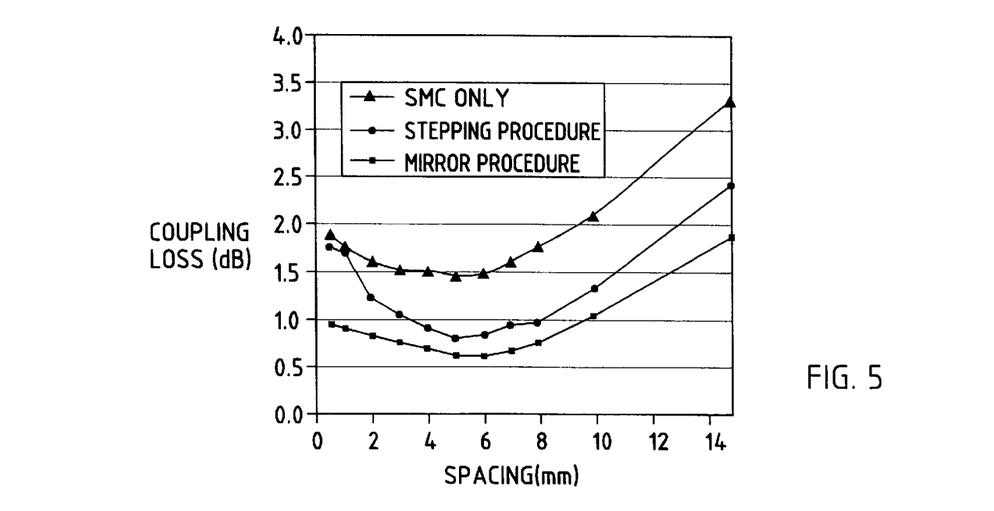
FIG. 5 is a graph depicting coupling loss as a function of spacing using the SMC fiber procedure, the stepping procedure, and the mirror procedure.

FIG. 5 depicts coupling loss as a function of distance for the previously described procedures. A minimum coupling loss of a pair of collimators aligned by the mirror procedure is 0.6 dB, without an anti-reflection (AR) coating on the microlens surface. As such, coupling loss should be typically less than 0.5 dB when the microlens surface is AR coated. It should be noted that the accuracy of alignment was improved from between a range of about 0.5 to 1 micron to about 0.1 micron in the X and Y axis and from 0.1 degree to 0.01 degree in the θX, θY and θZ axis alignment.

Figure 6:
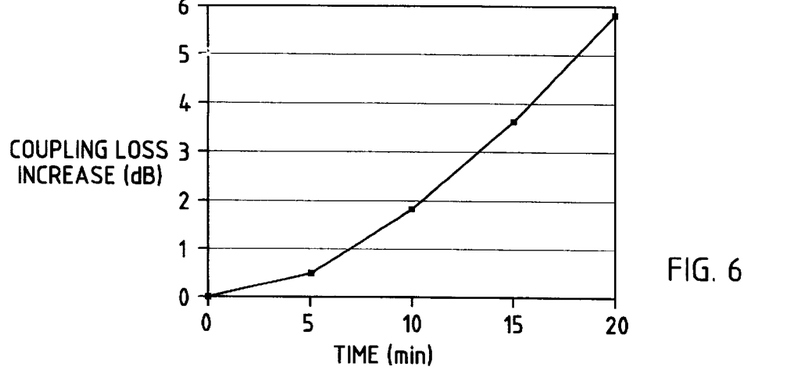
FIG. 6 is a graph depicting coupling loss increase as a function of time for the setup of FIG. 4.

Moving to FIG. 6, a graph depicting the deviation in alignment as a function of time for an optical fiber array block and a microlens array substrate after being aligned in one channel is shown. The increase in loss with time is mainly due to thermal expansion or shrinkage of the holders and the brackets on the auto-aligner and vibration of the auto-aligner. In the process of alignment using a mirror, the mirror and optical fiber array block are aligned and parallel at which point they are left for a period of time in which the mirror may move to a certain extent during alignment of the substrate and the block. The instability of the auto-aligner is generally exhibited by all commercially available models.

Figure 7:
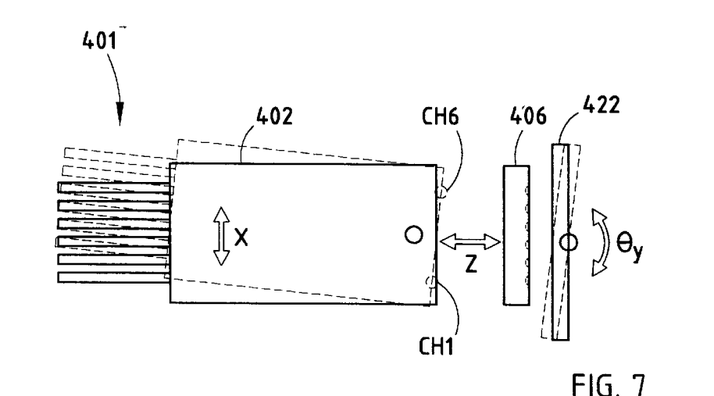
FIG. 7 is a top view diagram depicting movement of the optical fiber array block and the mirror of FIG. 4 in relation to the microlens array substrate.

As shown in FIG. 7, another factor that affects the alignment of the components is the deviation of the center of rotation of the auto-aligner from the tip of a first channel (CH1) and a last channel (CH6) of the block 402 and the surface of the mirror 422. In a typical auto-aligner, the substrate 406 is fixed and the mirror 422 and the block 402 are moved to facilitate alignment. However, when the block 402 and the mirror 422 are moved, for example, in the θY axis, the tip of the first channel and the last channel, which are used for alignment points, move not only in θY but also in the X and Z axes. The mirror 422 moves similarly to the block 402 and while the block 402 can be automatically aligned in the X axis, misalignment can remain in the Z axis.

Figure 8:
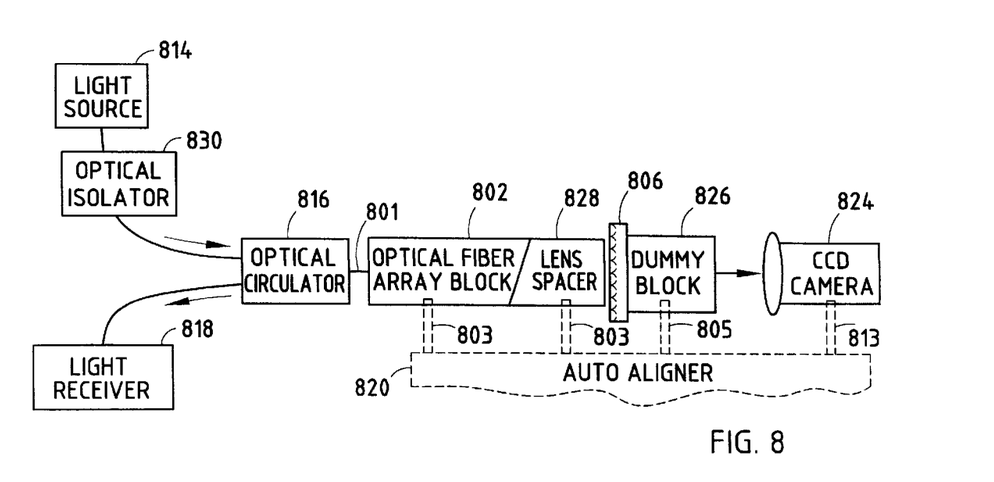
FIG. 8 is a block diagram of another setup for aligning components of an arrayed optical fiber collimator, according to another embodiment of the present invention.

According to another embodiment of the present invention, as is illustrated in FIG. 8, a dummy block (preferably, an $SiO_2$ or glass block) 826 is utilized in place of the mirror 422 of FIG. 4. The dummy block 826 is attached to a surface of the substrate 806. As shown, the optical fiber array block 802 includes a lens spacer 828 that is coupled (e.g., with an optical adhesive) to a surface of the block 802 such that the block 802 and the spacer 828 form an integrated unit. As such, the block 802 and the spacer 828 are attached to auto-aligner 820 by a single fixture 803. Likewise, the dummy block 826 is attached to the substrate 806, which is coupled to the auto-aligner 820 by a single fixture 805. A CCD camera 824 is also coupled to the auto-aligner 820 by a fixture 813. A light source (e.g., a laser diode) 814 provides a light beam, through an optical isolator 830, to an optical circulator 816. The circulator 816 is coupled to a plurality of optical fibers 801, which are retained in the block 802. Preferably, light is inserted into a first optical fiber of the fibers 801 and a last optical fiber of the plurality of optical fibers 801 and the block 802 and the substrate 806 are roughly aligned by visually examining the lighting position through the microlenses of the substrate 806 with a CCD camera 824. The collimated light beam formed by the microlens of the substrate 806 is partially reflected at a surface of the dummy block 826, whose thickness preferably corresponds to the optical length from the lens surface to the beam waist point. The reflected light is reintroduced into the fiber and directed into a light receiver (e.g., a photodetector) 818 by the circulator 816. The alignment of the block 802 (including the spacer 828) and the substrate 805 (including the dummy block 826) is achieved by checking the optical powers of the first channel and the last channel. Alternatively, each channel may be examined. In this manner, the substrate 806 and the block 802 are precisely aligned in all six axes (X, Y, Z, θX, θY and θZ) through examining the reflected light power. When proper alignment is achieved, an adhesive (e.g., an ultraviolet (UV) optical adhesive) is inserted between a surface of the spacer 828 and a surface of the substrate 806 such as to create an integrated collimator. A primary advantage of this procedure over the previously described procedure is that the number of parts that have to be held on the auto-aligner decreases from three to two, which allows more precise alignment to be achieved.

Figure 9:
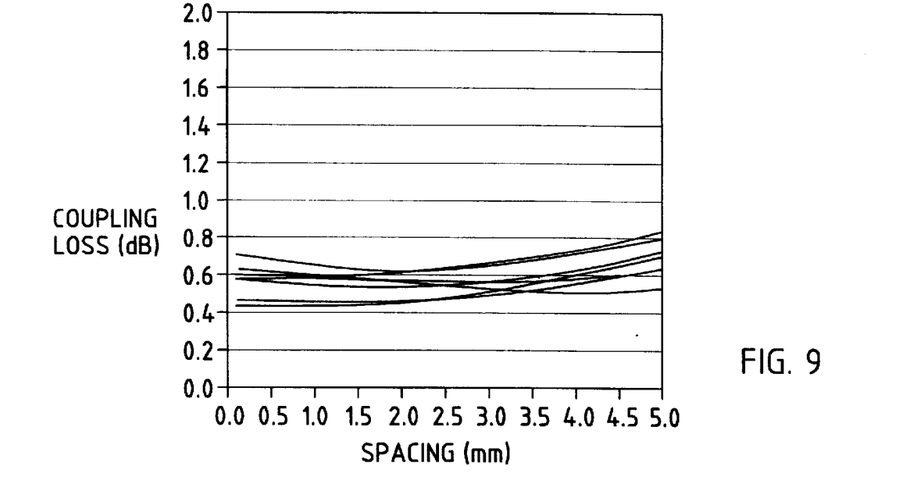
FIG. 9 is a graph depicting coupling loss as a function of distance for a number of collimator pairs constructed using the setup of FIG. 8.

FIG. 9 is a graph illustrating a plurality of curves that define coupling loss as a function of spacing for a number of pairs of collimators fabricated using the setup of FIG. 8. The minimum coupling loss of a pair of collimators aligned using a dummy block was 0.4 dB (Fresnel reflection loss was eliminated, however, connector loss was included). It should be noted that the accuracy of alignment was improved from a range of about ten to twenty microns to about one micron in the Z axis and this procedure is applicable to all six axes.

Figure 10:
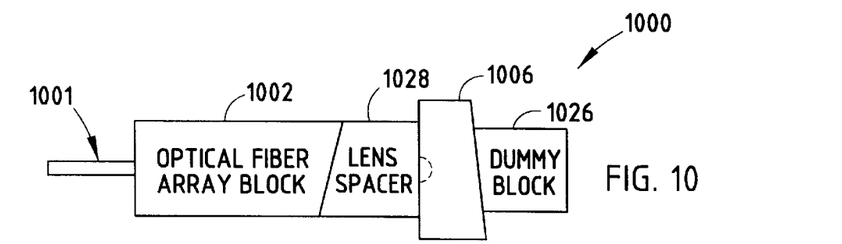
FIG. 10 is a diagram of an arrayed optical fiber collimator that uses a slanted dummy block with a sloped surface to mate a slanted surface of the microlens array substrate.
Figure 11:
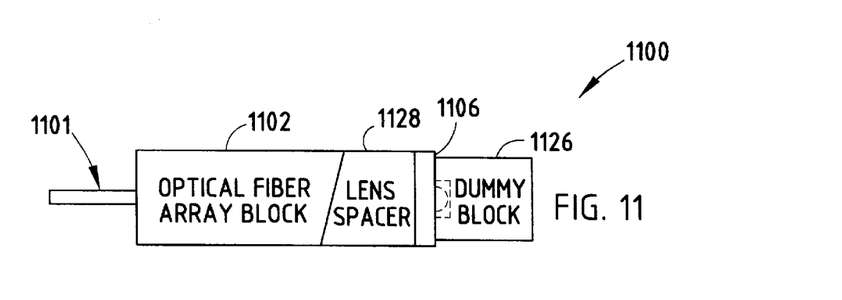
FIG. 11 is a side view of an arrayed optical fiber collimator that uses a dummy block with a dent for acceptance of a convex-type or a diffractive microlens.
Figure 12:
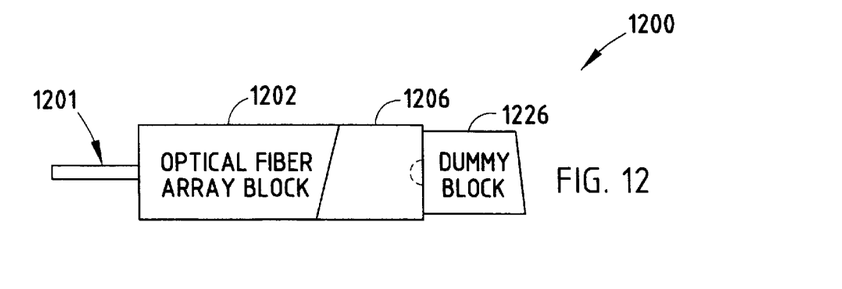
FIG. 12 is a side view of an arrayed optical fiber collimator that includes a dummy block with a sloped back surface, which is used with collimators that have a collimated light beam that is aligned at a few degrees deviated from the optical axis of the microlens.

The previously described procedures are applicable to a wide variety of collimator configurations. For example, FIG. 10 depicts an arrayed optical fiber collimator 1000 that includes a dummy block 1026 that has an angled face to match a sloped back surface of a microlens array substrate 1006. Angling the face of the dummy block 1026 compensates for the slope of the substrate 1006 and provides for more precise alignment. As shown in FIG. 11, a collimator 1100 with convex or diffractive lenses may include a dummy block 1126 with a void (e.g., a dent) for alignment. As shown in FIG. 12, when the collimated light beam is designed to be at a few degrees deviated from the optical axis of the microlenses of a microlens array substrate 1206, a dummy block 1226 with a slanted back surface may advantageously be used for more precise alignment. Accordingly, a number of procedures have been described herein, which generally reduce the loss of an arrayed optical fiber collimator over prior construction techniques.

It will become apparent to those skilled in the art that various modifications to the preferred embodiment of the invention as described herein can be made without departing from the spirit or scope of the invention as defined by the appended claims.

The invention claimed is:

1. A method for actively aligning components of an arrayed optical fiber collimator, the method comprising the steps of:
    (a) providing a first fixture for receiving and retaining an optical fiber array block, the optical fiber array block receiving and retaining a plurality of individual optical fibers;
    (b) providing a second fixture for receiving and retaining a microlens array substrate, the microlens array substrate including a plurality of microlenses integrated along a microlens surface and a substrate surface opposite the microlens surface;
    (c) providing a third fixture for receiving and retaining at least a portion of a first light receiver, wherein the first light receiver is positioned to receive a light beam from at least one of the integrated microlenses;
    (d) providing at least one light beam from a light source to at least one of the plurality of individual optical fibers;
    (e) adjusting the position of at least one of the microlens array substrate and the optical fiber array block in relation to each other to maximize the optical power of the light beam received by the first light receiver; and
    (f) fixing the optical fiber array block to the microlens array substrate when the optical power provided by the integrated microlens is at a maximum, wherein a finished arrayed optical fiber collimator is provided.

2. The method of claim 1, wherein the first light receiver includes a single-mode collimated fiber that is coupled to a detector at one end, and wherein another end of the single-mode collimated fiber is positioned to receive a light beam from one of the integrated microlenses, where the optical fiber array block is fixed to the microlens array substrate when the optical power provided to the detector is at a maximum.

3. The method of claim 2, further including the step of:
    replacing the single-mode collimated fiber with the finished arrayed optical fiber collimator and repeating steps (a) through (f).

4. The method of claim 1, further including the steps of:
providing a half-mirror between the first light receiver and the microlens array substrate, wherein the half-mirror is aligned in parallel to the optical fiber array block, the half-mirror partially reflecting the light beam when the light beam is at a desired wavelength;
providing one of an optical coupler and an optical circulator coupled between the light source and the optical fiber array block, wherein one of the optical coupler and the optical circulator are coupled to at least one of the plurality of individual optical fibers; and
providing a second light receiver coupled to an output port of one of the optical circulator and the optical coupler, where the optical fiber array block is fixed to the microlens array substrate when the optical power provided to the second light receiver is at a maximum.

5. The method of claim 4, wherein the first light receiver is a charge coupled device (CCD) camera.

6. The method of claim 4, wherein the half-mirror is positioned at an optical beam waist point of the integrated microlenses.

7. The method of claim 1, further including the steps of:
attaching a dummy block to the microlens array substrate, the dummy block partially reflecting the light beam;
providing one of an optical coupler and an optical circulator coupled between the light source and the optical fiber array block, wherein one of the optical coupler and the optical circulator are coupled to at least one of the plurality of individual optical fibers; and
providing a second light receiver coupled to an output port of one of the optical circulator and the optical coupler, where the optical fiber array block is fixed to the microlens array substrate when the optical power provided to the second light receiver is at a maximum.

8. The method of claim 7, wherein the first light receiver is a charge coupled device (CCD) camera.

9. The method of claim 7, wherein the dummy block is made of one of $SiO_2$ and glass.

10. The method of claim 1, wherein the plurality of individual optical fibers includes a first optical fiber and a last optical fiber, and wherein a light beam is provided to both the first and last optical fibers to facilitate alignment.

11. The method of claim 10, wherein at least one other optical fiber is positioned between the first optical fiber and the last optical fiber.

12. The method of claim 7, wherein the dummy block is attached to the substrate surface of the microlens array substrate.

13. The method of claim 7, wherein the dummy block is attached to the microlens surface of the microlens array substrate.

14. The method of claim 13, wherein the dummy block includes a first surface that is attached to the microlens surface and a second surface, and wherein the microlenses are one of refractive lenses and diffractive lenses and the dummy block is configured to provide an air gap between the microlens surface and the first surface.

15. The method of claim 13, wherein the dummy block includes a first surface that is attached to the microlens surface and a second surface, and wherein the microlenses are graded-index (GRIN) lenses and the second surface of the dummy block is slanted.

16. The method of claim 1, wherein the first, second and third fixtures are coupled to an auto-aligner for facilitating movement of the optical fiber array block and the microlens array substrate with respect to the light receiver along three orthogonal axes.

17. The method of claim 1, wherein the microlenses are one of graded-index (GRIN) lenses, refractive lenses and diffractive lenses.

18. A system for actively aligning components of an arrayed optical fiber collimator, the system comprising:
an auto-aligner;
a first fixture for receiving, retaining and coupling an optical fiber array block to the auto-aligner, the optical fiber array block receiving and retaining a plurality of individual optical fibers;
a second fixture for receiving, retaining and coupling a microlens array substrate to the auto-aligner, the microlens array substrate including a plurality of microlenses integrated along a microlens surface and a substrate surface opposite the microlens surface;
a third fixture for receiving, retaining and coupling at least a portion of a first light receiver to the auto-aligner, wherein the first light receiver is positioned to receive a light beam from at least one of the integrated microlenses; and
a light source providing at least one light beam to at least one of the plurality of individual optical fibers, wherein the auto-aligner adjusts the position of at least one of the microlens array substrate and the optical fiber array block in relation to each other to maximize the optical power of the light beam received by the first light receiver, and wherein the optical fiber array block is fixed to the microlens array substrate when the optical power provided by the integrated microlens is at a maximum, thereby providing a finished arrayed optical fiber collimator.

19. The system of claim 18, wherein the first light receiver includes a single-mode collimated fiber that is coupled to a detector at one end, and wherein another end of the single-mode collimated fiber is positioned to receive a light beam from one of the integrated microlenses, where the optical fiber array block is fixed to the microlens array substrate when the optical power provided to the detector is at a maximum.

20. The system of claim 19, wherein the single-mode collimated fiber is replaced with the finished arrayed optical fiber collimator which is then used to couple another light beam to the detector for aligning a next arrayed optical fiber collimator.

21. The system of claim 18, further including:
a fourth fixture for receiving and retaining a half-mirror coupled to the auto-aligner, the half-mirror being provided between the first light receiver and the microlens array substrate, wherein the half-mirror is aligned in parallel to the optical fiber array block, the half-mirror partially reflecting the light beam when the light beam is at a desired wavelength;
one of an optical coupler and an optical circulator coupled between the light source and the optical fiber array block, wherein one of the optical coupler and the optical circulator are coupled to at least one of the plurality of individual optical fibers; and
a second light receiver coupled to an output port of one of the optical circulator and the optical coupler, wherein the optical fiber array block is fixed to the microlens array substrate when the optical power provided to the second light receiver is at a maximum.

22. The system of claim 21, wherein the first light receiver is a charge coupled device (CCD) camera.

23. The system of claim 21, wherein the half-mirror is positioned at an optical beam waist point of the integrated microlenses.

24. The system of claim 18, further including:
a dummy block attached to the microlens array substrate, the dummy block partially reflecting the light beam;
one of an optical coupler and an optical circulator coupled between the light source and the optical fiber array block, wherein one of the optical coupler and the optical circulator are coupled to at least one of the plurality of individual optical fibers; and
a second light receiver coupled to an output port of one of the optical circulator and the optical coupler, wherein the optical fiber array block is fixed to the microlens array substrate when the optical power provided to the second light receiver is at a maximum.

25. The system of claim 24, wherein the first light receiver is a charge coupled device (CCD) camera.

26. The system of claim 24, wherein the dummy block is made of one of $SiO_2$ and glass.

27. The system of claim 18, wherein the plurality of individual optical fibers includes a first optical fiber and a last optical fiber, and wherein a light beam is provided to both the first and last optical fibers to facilitate alignment.

28. The system of claim 27, wherein at least one other optical fiber is positioned between the first optical fiber and the last optical fiber.

29. The system of claim 24, wherein the dummy block is attached to the substrate surface of the microlens array substrate.

30. The system of claim 24, wherein the dummy block is attached to the microlens surface of the microlens array substrate.

31. The system of claim 30, wherein the dummy block includes a first surface that is attached to the microlens surface and a second surface, and wherein the microlenses are one of refractive lenses and diffractive lenses and the dummy block is configured to provide an air gap between the microlens surface and the first surface.

32. The system of claim 30, wherein the dummy block includes a first surface that is attached to the microlens surface and a second surface, and wherein the microlenses are graded-index (GRIN) lenses and the second surface of the dummy block is slanted.

33. The system of claim 24, wherein the microlenses are one of graded-index (GRIN) lenses, refractive lenses and diffractive lenses.

34. A method for actively aligning components of an arrayed optical fiber collimator, the method comprising the steps of:
(a) receiving and retaining an optical fiber array block including a plurality of individual optical fibers;
(b) receiving and retaining a microlens array substrate including a plurality of microlenses integrated along a microlens surface and a substrate surface opposite the microlens surface;
(c) receiving and retaining at least a portion of a first light receiver, wherein the first light receiver is positioned to receive a light beam from at least one of the integrated microlenses and includes a single-mode collimated fiber that is coupled to a detector at one end, and wherein another end of the single-mode collimated fiber is positioned to receive a light beam from one of the integrated microlenses;
(d) providing at least one light beam from a light source to at least one of the plurality of individual optical fibers;
(e) adjusting the position of at least one of the microlens array substrate and the optical fiber array block in relation to each other to maximize the optical power of the light beam received by the first light receiver;
(f) fixing the optical fiber array block to the microlens array substrate when the optical power provided to the detector is at a maximum, wherein a finished arrayed optical fiber collimator is provided; and
(g) replacing the single-mode collimated fiber with the finished arrayed optical fiber collimator and repeating steps (a) through (f).

35. A method for actively aligning components of an arrayed optical fiber collimator, the method comprising the steps of:
(a) providing a first fixture for receiving and retaining an optical fiber array block, the optical fiber array block receiving and retaining a plurality of individual optical fibers;
(b) providing a second fixture for receiving and retaining a microlens array substrate, the microlens array substrate including a plurality of microlenses integrated along a microlens surface and a substrate surface opposite the microlens surface;
(c) providing a third fixture for receiving and retaining at least a portion of a first light receiver, wherein the first light receiver is positioned to receive a light beam from at least one of the integrated microlenses;
(d) providing at least one light beam from a light source to at least one of the plurality of individual optical fibers;
(e) providing a half-mirror between the first light receiver and the microlens array substrate, wherein the half-mirror is aligned in parallel to the optical fiber array block, the half-mirror partially reflecting the light beam when the light beam is at a desired wavelength;
(f) providing one of an optical coupler and an optical circulator coupled between the light source and the optical fiber array block, wherein one of the optical coupler and the optical circulator are coupled to at least one of the plurality of individual optical fibers;
(g) providing a second light receiver coupled to an output port of one of the optical circulator and the optical coupler;
(h) initially adjusting the position of at least one of the microlens array substrate and the optical fiber array block in relation to each other to maximize the optical power of the light beam received by the first light receiver; and
(i) fixing the optical fiber array block to the microlens array substrate when the optical power provided to the second light receiver is at a maximum, wherein a finished arrayed optical fiber collimator is provided.

36. The method of claim 35, wherein the first light receiver is a charge coupled device (CCD) camera.

37. The method of claim 35, wherein the half-mirror is positioned at an optical beam waist point of the integrated microlenses.

38. A method for actively aligning components of an arrayed optical fiber collimator, the method comprising the steps of:
(a) providing a first fixture for receiving and retaining an optical fiber array block, the optical fiber array block receiving and retaining a plurality of individual optical fibers;
(b) providing a second fixture for receiving and retaining a microlens array substrate, the microlens array substrate including a plurality of microlenses integrated along a microlens surface and a substrate surface opposite the microlens surface;

(c) providing a third fixture for receiving and retaining at least a portion of a first light receiver, wherein the first light receiver is positioned to receive a light beam from at least one of the integrated microlenses;

(d) providing at least one light beam from a light source to at least one of the plurality of individual optical fibers;

(e) attaching a dummy block to the microlens array substrate, the dummy block partially reflecting the light beam;

(f) providing one of an optical coupler and an optical circulator coupled between the light source and the optical fiber array block, wherein one of the optical coupler and the optical circulator are coupled to at least one of the plurality of individual optical fibers;

(g) providing a second light receiver coupled to an output port of one of the optical circulator and the optical coupler;

(h) initially adjusting the position of at least one of the microlens array substrate and the optical fiber array block in relation to each other to maximize the optical power of the light beam received by the first light receiver; and (i) fixing the optical fiber array block to the microlens array substrate when the optical power provided to the second light receiver is at a maximum, wherein a finished arrayed optical fiber collimator is provided.

39. The method of claim 38, wherein the first light receiver is a charge coupled device (CCD) camera.

40. The method of claim 38, wherein the dummy block is made of $SiO_2$ or glass.

* * * * *